(12) United States Patent
Chen (10) Patent No.: US 8,270,785 B2
(45) Date of Patent: Sep. 18, 2012

(54) METHODS AND APPARATUS TO MAKE SUBSTANTIALLY UNIFORM LOSSES IN OPTICAL CROSS CONNECTS

(75) Inventor: Jerry C. Chen, Lexington, MA (US)

(73) Assignee: Tellabs Operations, Inc., Naperville, IL (US)

( * ) Notice: Subject to any disclaimer, the term of this patent is extended or adjusted under 35 U.S.C. 154(b) by 48 days.

(21) Appl. No.: 12/579,108

(22) Filed: Oct. 14, 2009

(65) Prior Publication Data
US 2010/0034499 A1 Feb. 11, 2010

Related U.S. Application Data

(60) Continuation of application No. 12/137,023, filed on Jun. 11, 2008, now Pat. No. 7,623,744, which is a division of application No. 11/008,735, filed on Dec. 9, 2004, now Pat. No. 7,400,792.

(51) Int. Cl.
*G02B 6/42* (2006.01)
*G02B 6/32* (2006.01)

(52) U.S. Cl. ............... 385/17; 385/16; 385/18; 385/33; 385/39

(58) Field of Classification Search ............. 385/16–21, 385/24, 31, 33, 39, 140
See application file for complete search history.

(56) References Cited

U.S. PATENT DOCUMENTS 5,841,917 A * 11/1998 Jungerman et al. ............ 385/17
6,215,921 B1 * 4/2001 Lin ................................ 385/18
2002/0102045 A1 * 8/2002 Ao .................................. 385/17

* cited by examiner

*Primary Examiner* — Uyen Chau N Le
*Assistant Examiner* — Michael Mooney
(74) *Attorney, Agent, or Firm* — Hush Blackwell LLP (57) ABSTRACT

A method for cross connecting optical signals includes using a common beam steerer to direct a set of optical signals from a set of input ports to a set of output ports. The method further includes adjusting a curvature of the common beam steerer so that paths of the optical signals have substantially the same effective path length.

23 Claims, 6 Drawing Sheets

METHODS AND APPARATUS TO MAKE SUBSTANTIALLY UNIFORM LOSSES IN OPTICAL CROSS CONNECTS

CROSS-REFERENCE TO RELATED APPLICATION

This continuation application claims the benefit of the filing dates of U.S. Utility application Ser. No. 12/137,023 filed Jun. 11, 2008 which is a divisional of U.S. Utility application Ser. No. 11/008,735 filed Dec. 9, 2004 and entitled "Methods and Apparatus to Make Substantially Uniform Losses in Optical Cross Connects".

FIELD OF THE INVENTION

The invention pertains to optical cross connects and switches for telecommunications. More particularly, the invention pertains to such structures which can make substantially uniform insertion losses.

BACKGROUND OF THE INVENTION

A variety of optical telecommunication cross connects, or, switches have been developed to facilitate switching between a plurality of optical inputs and a plurality of optical outputs. Some of the known switches have been configured as 2D N×M matrix switches. One such configuration is disclosed in U.S. Pat. No. 6,363,182 entitled "Optical Switch for Reciprocal Traffic" issued Mar. 26, 2002. In such switches, a two dimensional array of optical deflectors is used to switch signals between input and output ports.

Architectures using known steering structures, for example, at least one at the input port or the output port, or both produce varying optical path lengths. This in turn results in known 3D cross connects exhibiting varying insertion losses depending on the effective optical path length. Non-uniformity of the insertion losses is a negative in terms of system design and performance.

There continues to be a need for cross connects which exhibit substantially constant insertion losses. Preferably, uniformity of insertion loss can be achieved without adding substantial manufacturing complexity or cost to the respective cross connects or switches.

SUMMARY OF THE INVENTION

An apparatus for cross connecting optical signals includes a first set of ports, in which members of the first set are adapted to receive and/or transmit optical signals. The apparatus further includes a second set of ports, in which members of the second set are adapted to receive and/or transmit optical signals. In addition, the apparatus includes a common beam steerer having a curved surface. The first and second sets of ports are positioned relative to the common beam steerer so that paths of the optical signals transmitted between the members of the first and second sets of ports and steered by the common beam steerer have substantially the same effective path length.

A method for cross connecting optical signals includes using a common beam steerer to direct a set of optical signals from a set of input ports to a set of output ports. The method further includes adjusting a curvature of the common beam steerer so that paths of the optical signals have substantially the same effective path length.

An apparatus for cross connecting optical signals includes first and second input ports, first and second output ports, first and second beam steerers, and a collimator. The first beam steerer is adapted to receive a first optical signal from the first input port and direct the optical signal to the first output port. The second beam steerer is adapted to receive an second optical signal from the second input port and direct the optical signal to the second output port. The collimator is adapted to collimate the first optical signal so that a path of the first optical signal has substantially the same insertion loss as a path the second optical signal.

DETAILED DESCRIPTION OF THE EMBODIMENTS

While embodiments of this invention can take many different forms, specific embodiments thereof are shown in the drawings and will be described herein in detail with the understanding that the present disclosure is to be considered as an exemplification of the principles of the invention and is not intended to limit the invention to the specific embodiment illustrated.

Beam steering optical cross connects, described below, exhibit improved performance by minimizing path length differences between different pairs of ports configured on a planar input/output array or a planar input array and separate, output array. Preferably, path lengths between input and output ports will have close to an optimal optical coupling distance, as would be establishable by those of skill in the art.

In the present instance, planar arrays can employ beam steerers which are curved, such as curved mirrors or lenses, to reduce path length variations. Such construction takes advantage of the fact that planar arrays can be easier to manufacture and more cost effective than curved arrays.

Variation in path length can be defined as:

Variation=(Max−Min)/Average=2(Max−Min)/(Max+Min).

"Max" is the maximum optical path length. "Min" is the minimum optical path length for a selected architecture. Variation is thus a function of the difference between maximum path length and minimum path length. By reducing the difference between maximum and minimum path lengths, by for example reducing the maximum path length or increasing the minimum path length, the path lengths can be expected to move closer to the average or optimal value and can provide substantially uniform insertion losses.

Figure 1A:
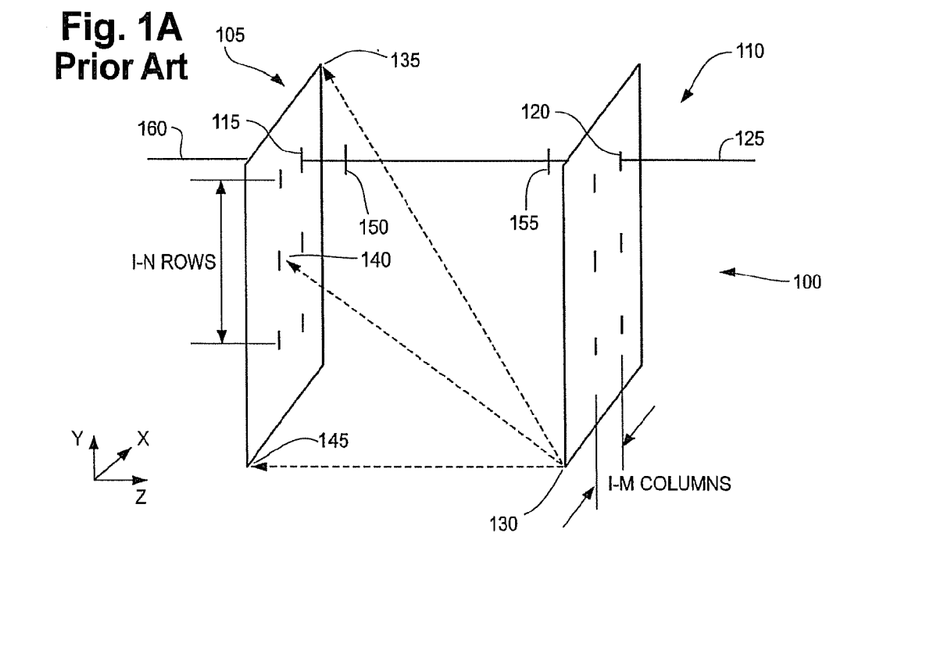
FIG. 1A is a perspective view of a portion of an optical cross connect, including a two-dimensional array of ports on a plane, having N rows and M columns, and a correspondingly sized array of ports.

FIG. 1A shows an existing approach, optical cross connect 100, which helps to illustrate some of the concepts incorporated in exemplary embodiments of the invention. Optical cross connect 100 includes an arrays 105 and 110 having M columns and N rows of ports (which can receive and/or transmit optical signals) and beam steerers 150 and 155. Accordingly, in cross connect 100, an optical signal 160 can enter port 115 of array 105 and be steered by beam steerer 150, in order to be directed to another port 120 of array 120, and exit as optical signal 125. Similarly, an optical signal 125 can enter port 120 of array 110, be steered by beam steerer 155, in order to be directed to port 115 of array 105, and exit as optical signal 160.

The various optical path lengths of the planar arrangement of FIG. 1A can be measured as follows. Ports and beam steerers can be positioned to be confined to a plane, e.g. arranged in a circle or rectangle on a plane. For example, using the X-Y-Z axes designated in FIG. 1A, an input port and beam steerer can be placed at the coordinates (x, y) of the X-Y plane on which one array resides and an output port and beam steerer can be placed at the coordinates (x, y) of the X-Y plane on which the other array resides. Accordingly, depending upon the placement of an input port, output port or a beam steerer, the optical path length between an input port and an output port can vary. The smallest optical path length (for transmitting a signal between an input port and an output port) is min=z, the distance of a beam of light running perpendicular to both X-Y planes. FIG. 1A illustrates the smallest optical path length between arrays 110 and 105 as the distance between points 130 and 145. The longest optical path length is max=sqrt($x^2+y^2+z^2$), the distance from the coordinates ($x_{min}$, $y_{min}$) on the X-Y plane of one array to the coordinates ($x_{max}$, $y_{max}$) of the X-Y plane of the other array. FIG. 1A illustrates the longest optical path length between arrays 110 and 105 as the distance between points 130 and 135. The median optical path length is median=sqrt($z^2+(x/2)^2+(y/2)^2$). FIG. 1A illustrates the median optical path length between arrays 110 and 105 as the distance between points 130 and 140. The fractional or percentage variation is var=(max−min)/(median)=(sqrt($x^2+y^2+z^2$)−z)/sqrt($z^2+(x/2)^2+(y/2)^2$).

Figure 1B:
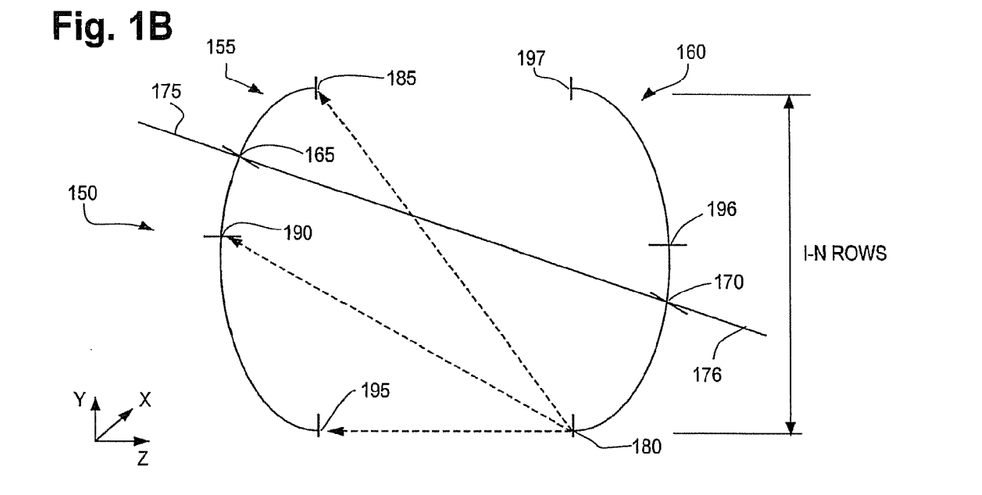
FIG. 1B is an end view of a portion of an optical cross connect including a two-dimensional array of ports on a curve, having N rows and M columns, and a correspondingly sized array of ports on a curve, according to an exemplary embodiment of the invention.

FIG. 1B shows an exemplary embodiment optical cross connect 105 which further illustrates some of the concepts incorporated in other exemplary embodiments of the invention. It is similar to the arrangement of FIG. 1A except that ports 185, 165, 190, 195, 197, 196, 170 and 180 and beam steerers (not shown) at those ports are arranged on a curve of a sphere. In FIG. 1B, array 155 has M columns (not shown) and N rows of input and/or output ports. Array 160 has M columns (not shown) and N rows of input and/or output ports. Each of the ports of arrays 155 and 160 can transmit an optical signal to a beam steerer. Accordingly, an optical signal 175, entering port 165 of array 155 can be steered by a beam steerer (not shown) at port 165, to be directed to port 170 of array 160, and exit as optical signal 176. Likewise, an optical signal 175 entering port 170 of array 160, can be steered by a beam steerer (not shown) at port 170, to be directed to port 165 of array 155, and exit as optical signal 175.

The various optical path lengths of the planar arrangement of FIG. 1B can be measured as follows. Beam steerers and ports can be confined to a curve, e.g. arranged in a circle or rectangle on a sphere. For example, using the X-Y-Z axes designated in FIG. 1B, an input port can be placed at the coordinates (x, y) of the sphere on which one array resides and an output port can be placed at the coordinates (x, y) of the sphere on which the other array resides. Accordingly, depending upon the placement of an input and an output port, the optical path length between an input port and an output port can vary. Z is the distance between the centers of the two spheres. X and y are the maximum distance transverse or perpendicular to z. Compared to the planar arrangement of FIG. 1A, x and y can be smaller than the x and y of FIG. 1A because the curve's surface area is greater than the surface area of the curve when projected onto a plane. Additionally, this greater surface area provides the benefit of permitting more beam steerers to be placed onto a given region. The smallest optical path length is min=z. FIG. 1B illustrates the smallest optical path length between arrays 160 and 155 as the distance between points 180 and 195. The longest optical path length is max=sqrt($z^2+x^2+y^2$), the distance from the coordinates ($x_{min}$, $y_{min}$) on the curve of one array to the coordinates ($x_{max}$, $y_{max}$) coordinates of the curve of the other array. FIG. 1B illustrates the longest optical path length between arrays 160 and 155 as the distance between points 180 and 185. The median optical path length is approximately median=sqrt($(z+d)^2+(x/2)^2+(y/2)^2$), where d is the distance from center of a sphere to outermost part of the sphere's curved surface. FIG. 1B illustrates the median optical path length between arrays 160 and 155 as the distance between points 180 and 190. The fractional or percentage variation is var=(max−min)/(median). The min and max values are identical to planar arrangement of FIG. 1A, but the median is larger because d>0. This implies that curved surfaces can provide lower path length variation. For an exemplary embodiment having a spherical surface, d=R−sqrt($R^2−(x^2+y^2)/4$), where R is the radius of curvature. For an exemplary embodiment having a parabolic surface, d=($x^2+y^2$)/R, where R can dictate the amount of curvature. In exemplary embodiments of the invention, the curve can be based on R and z and thus R and z can be varied to for example create an optimal surface, causing the reduction between minimum and maximum optical paths lengths, which can result in substantially uniform insertion losses.

Figure 2:
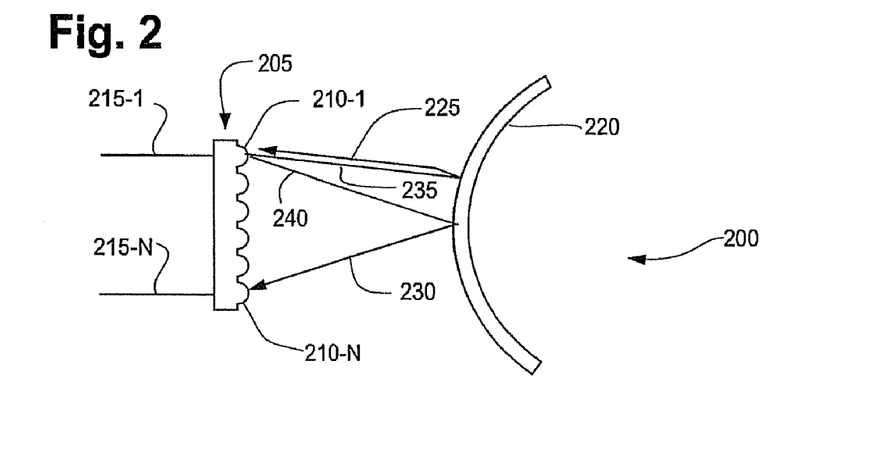
FIG. 2 is an end view an optical cross connect including an array of input/output ports and a curved beam steerer, according to an exemplary embodiment of the invention.

FIG. 2 illustrates an exemplary embodiment optical cross connect 200 which includes an array 205, having ports (210-1 to 210-N for receiving and/or transmitting optical signals 215-1 to 215-N). Cross connect 200 also includes a curved beam steerer 220 such as a curved mirror. Optionally, beam steerers can be used at any of the ports 210-1 to 210-N to steer one of the optical signal 215-1 to 215-N onto the curved beam steerer 220. The curvature of beam steerer 220 can be configured by for example by adjusting R and z to achieve an end result of reducing the difference between shorter path lengths (for example the path made from segments 225 and 235) and longer paths lengths (for example the path made from segments 230 and 240). As a result, the variation in insertion losses between paths of minimum and maximum distances can be reduced. Furthermore, by reflecting signals back to array 205 to exit at one of the ports 210-1 to 210-N, curved beam steerer 220 can eliminate the need for both an input and an output array and eliminate the need for ports 210-1 to 210-N to be predefined as inputs or outputs.

Figure 3:
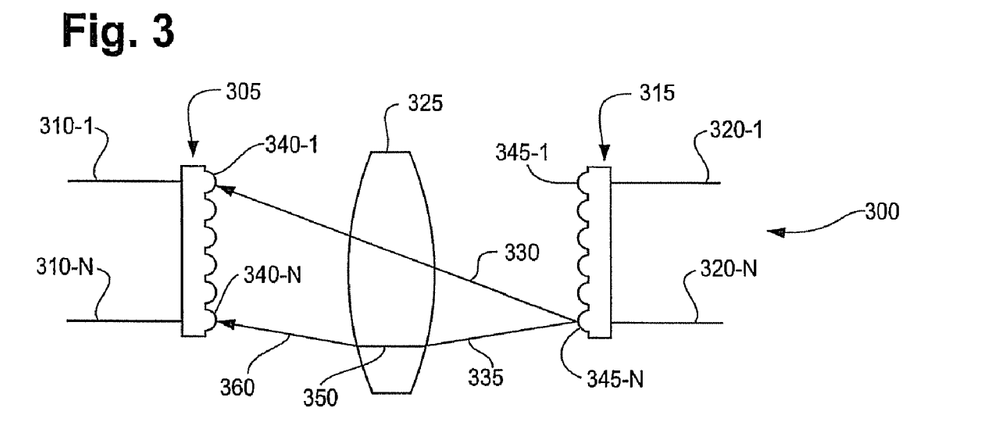
FIG. 3 is an end view of an optical cross connect including and input array, an output array and a curved beam steerer, according to an exemplary embodiment of the invention.

FIG. 3 illustrates an exemplary embodiment optical cross connect 300 which includes an input array 315 having ports (345-1 to 345-N for receipt of a plurality of optical signals 320-1 to 320-N), an output array 305 having ports (340-1 to 340-N for transmission of a plurality of signals 310-1 to 310-N). A curved beam steerer 325 (such as a lens) can be positioned between array 305 and array 315. Optionally, beam steerers can be used at any of the ports 345-1 to 345-N to steer one of the optical signals 320-1 to 320-N onto curved beam steerer 325. The curvature of beam steerer 325 can be configured for example by adjusting R and z to achieve an end result of reducing the difference between shorter path lengths (for example, the length of the path 330) and longer path lengths (for example, the length of the path made from segments 335, 350 and 360), which can make substantially uniform insertion losses.

Figure 4:
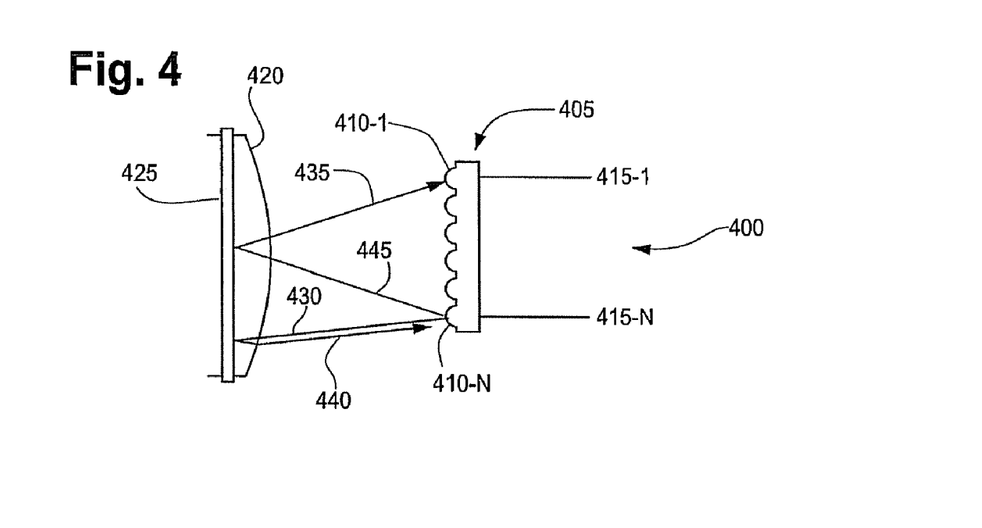
FIG. 4 is an end view of an optical cross connect including an array of input/output ports, a curved beam steerer and a reflective beam steerer, according to an exemplary embodiment of the invention.

FIG. 4 illustrates an exemplary embodiment optical cross connect 400, which includes an array 405, having ports (410-1 to 410-N for receiving and/or transmitting optical signals 415-1 to 415-N). Cross connect 400 also includes a curved beam steerer 420 (such as a lens) and a folding beam steerer 425 (such as a mirror). Optionally, beam steerers can be used at any of the ports 410-1 to 410-N to steer one of the optical signals 415-1 to 415-N onto curved beam steerer 420 and folding beam steerer 425. In this embodiment, folding beam steerer 425 is planar, but a curved and folding beam steerer may also be used to replace the combination of curved beam steerer 420 and planar folding beam steerer 425 or to just replace planar folding beam steerer 425. The curvature of beam steerer 420 can be configured for example by adjusting R and z to achieve an end result of reducing the difference between shorter path lengths (for example, the length of the path made from segments 430 and 440), and longer path lengths (for example, the length of the path made from segments 435 and 445), which can make substantially uniform insertion losses.

Figure 5A:
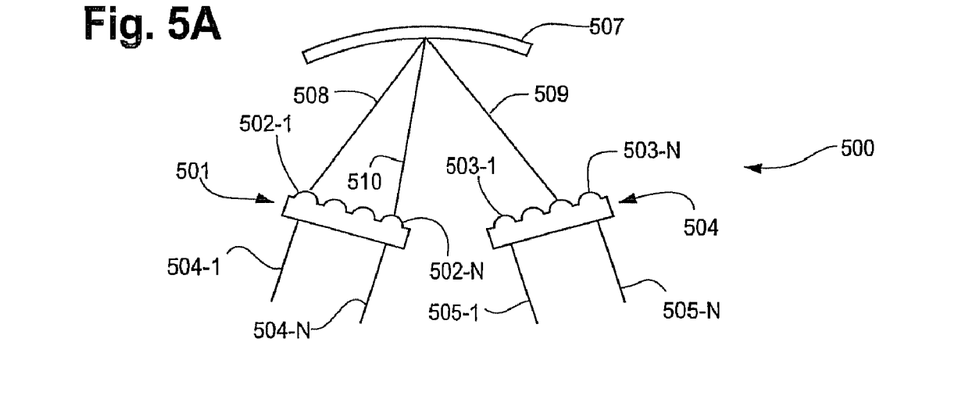
FIGS. 5A, 5B and 5C illustrate optical cross connects including arrays of input/output ports, one or more curved beam steerers, according to exemplary embodiments of the invention.
Figure 5B:
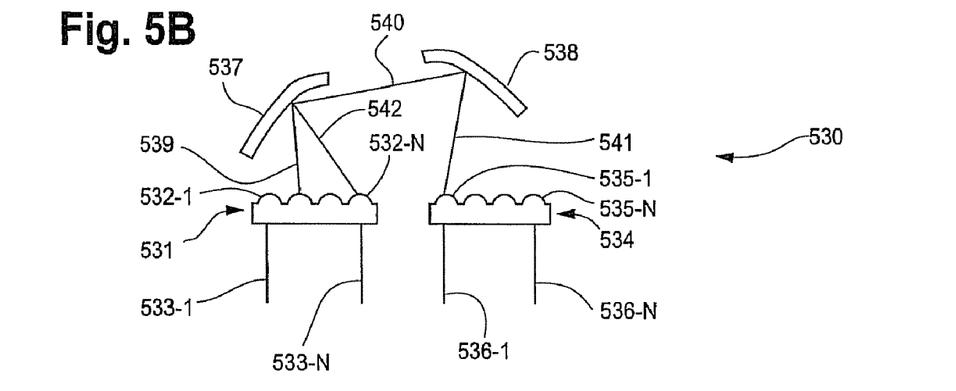
Figure 5C:
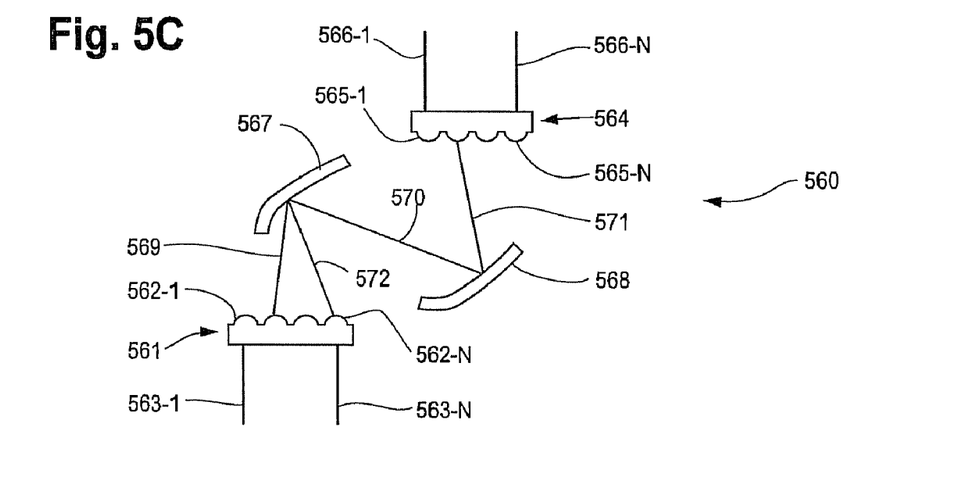

FIGS. 5A, 5B and 5C illustrate exemplary embodiment optical cross connects 500, 530 and 560 respectively which fold light paths using beam steerers (such as reflective surfaces). Cross connects 500, 530 and 560 also illustrate how folding light paths can provided the benefit of reducing physical system size, in addition to providing substantially uniform insertion losses.

FIG. 5A illustrates exemplary embodiment cross connect 500, which includes arrays 501 and 504 having ports (502-1 to 502-N and 503-1 to 503-N, respectively) for receiving and/or transmitting optical signals (504-1 to 504-N and 505-1 to 505-N, respectively) and curved beam steerer 507. Optionally, beam steerers can be used at any of the ports 502-1 to 502-N and 503-1 to 503-N to steer one of the optical signals 504-1 to 504-N and 505-1 to 505-N onto curved beam steerer 507. The curvature of beam steerer 507 can be configured for example by adjusting R and z to achieve an end result of reducing path length differences (such as the difference between the path length made from segments 508 and 509 and the path length made from segments 510 and 509). In addition, arrays 501 and 504 and beam steerer 507 can be positioned relative to each other to reduce physical system size and reduce the difference between path lengths.

FIG. 5B illustrates exemplary embodiment cross connect 530, which is similar to cross connect 500 of FIG. 5A, except that cross connect 530 includes two curved beam steerers 537 and 538. Cross connect 530 includes arrays 531 and 534, having ports (532-1 to 532-N and 535-1 to 535-N, respectively) for receiving and/or transmitting optical signals (533-1 to 533-N and 536-1 to 536-N, respectively). Optionally, beam steerers can be used at any of the ports 532-1 to 532-N and 535-1 to 535-N to steer one of the optical signals 533-1 to 533-N and 536-1 to 536-N onto curved beam steerers 537 and 538. The curvature of beam steerers 537 and 538 can be configured for example by adjusting R and z to achieve and end result of reducing path length differences (such as the difference in the path length made from segments 539, 540 and 541 and the path length made from segments 542, 540 and 541). In addition, arrays 531 and 534 and beam steerers 537 and 538, can be positioned relative to each other to reduce physical system size and reduce the difference between path lengths.

FIG. 5C illustrates exemplary embodiment cross connect 560, which is similar to cross connect 530 of FIG. 5B, except that cross connect 560 positions its arrays 561 and 564 and beam steerers 567 and 568 differently. Arrays 561 and 564 include ports (562-1 to 562-N and 565-1 to 565-N, respectively) for receiving and/or transmitting optical signals (563-1 to 563-N and 566-1 to 566-N, respectively). Optionally, beam steerers can be used at any of the ports 562-1 to 562-N and 565-1 to 565-N to steer one of the optical signals 563-1 to 563-N and 566-1 to 566-N onto curved beam steerers 567 and 568. The curvature of beam steerers 567 and 568 can be configured for example by adjusting R and z to achieve and end result of reducing path length differences (such as the difference between the path length made from segments 569, 570 and 571 and the path length made from segments 572, 570 and 571). In addition, arrays 561 and 564 and beam steerers 567 and 568, can be positioned relative to each other to reduce physical system size and reduce the difference between path lengths.

Figure 6A:
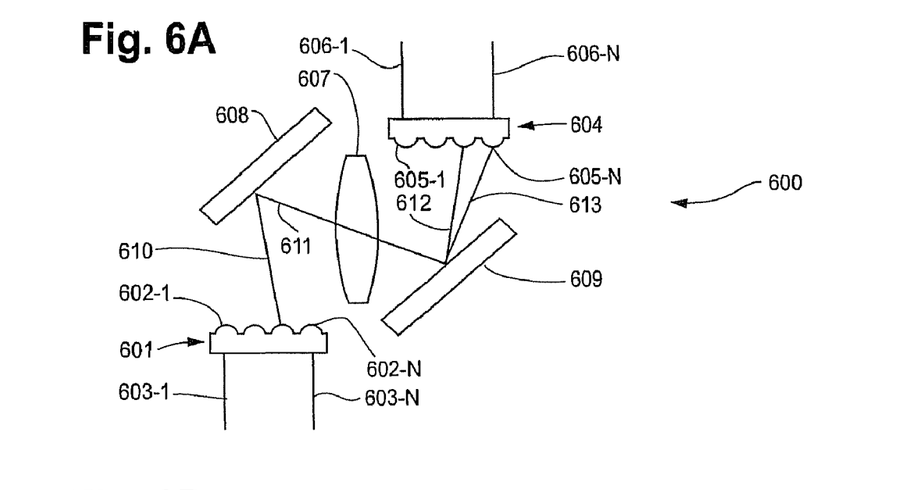
FIGS. 6A, 6B and 6C illustrate optical cross connects including arrays of input/output ports, one curved beam steerer and one or more reflective beam steering devices, according to exemplary embodiments of the invention.
Figure 6B:
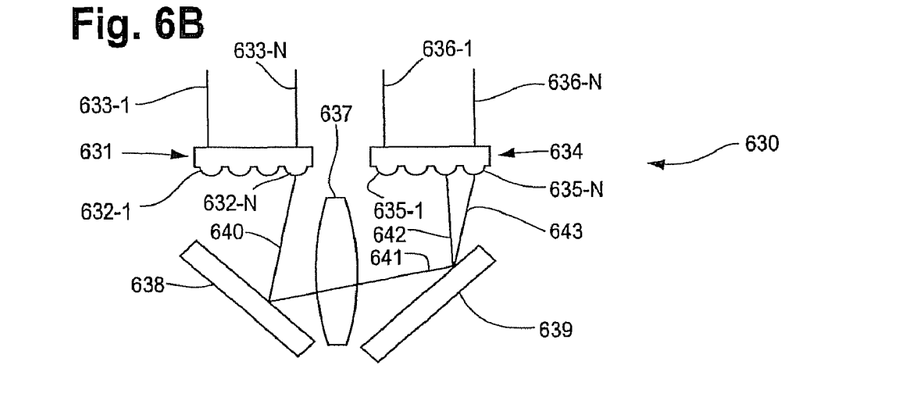
Figure 6C:
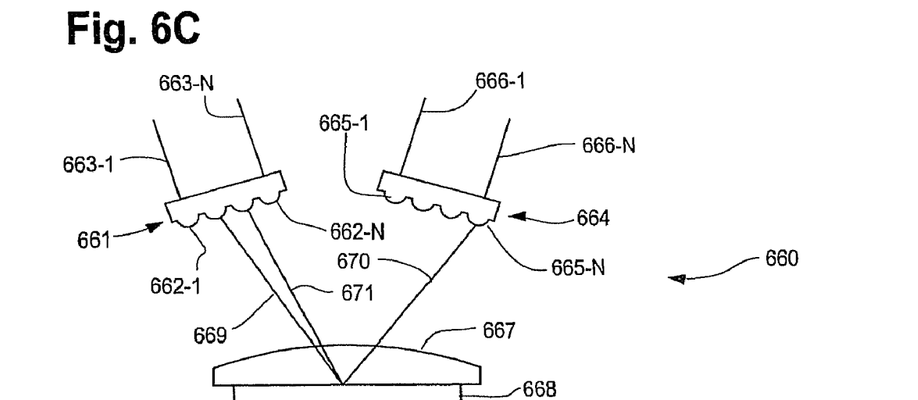

FIGS. 6A, 6B and 6C illustrate exemplary embodiment optical cross connects 600, 630 and 660 which fold light paths using beam steerers (such as mirrors and/or lenses). Cross connects 600, 630 and 660 also illustrate how folding light paths can reduce physical system size. Accordingly, configurations similar to cross connects 600, 630 and 660 can provide the benefits of reduced physical system size and can make substantially uniform insertion losses.

FIG. 6A illustrates exemplary embodiment cross connect 600, which includes arrays 601 and 604, having ports (602-1 to 602-N and 605-1 to 605-N, respectively) for receiving and/or transmitting optical signals (603-1 to 603-N and 606-1 to 606-N, respectively), beam steerers 607-609. Optionally, beam steerers can be used at any of the ports 602-1 to 602-N and 605-1 to 605-N to steer one of the optical signals 603-1 to 603-N and 606-1 to 606-N onto beam steerers 608 and 609. The curvature of beam steerer 607 can be configured for example by adjusting R and z to achieve an end result of reducing path length differences (such as the difference between the path length made from segments 610, 611 and 612 and the path length made from segments 610, 611 and 613). In addition, arrays 601 and 604 and beam steerers 607-609, can be positioned relative to each other to reduce physical system size and reduce the difference between path lengths.

FIG. 6B illustrates exemplary embodiment cross connect 630, which is similar to cross connect 600 of FIG. 6A, except that cross connect 630 positions its arrays 631 and 664 and beam steerers 638 and 639 differently. Arrays 631 and 634 include ports (632-1 to 632-N and 635-1 to 635-N, respectively) for receiving and/or transmitting optical signals (633-1 to 633-N and 636-1 to 636-N, respectively). Optionally, beam steerers can be used at any of the ports 632-1 to 632-N and 635-1 to 635-N to steer one of the optical signals 633-1 to 633-N and 636-1 to 636-N onto beam steerers 638 and 639. The curvature of beam steerer 637 can be configured for example by adjusting R and z to achieve and end result of reducing path length differences (such as the difference between the path length made from segments 640, 641 and 642 and the path length made from segments 640, 641 and 643). In addition, arrays 631 and 634, beam steerers 637-639, can be positioned relative to each other to reduce physical system size and reduce the difference between path lengths.

FIG. 6C illustrates exemplary embodiment cross connect 660, which includes arrays 661 and 664 having ports (662-1 to 662-N and 665-1 to 665-N, respectively) for receiving and/or transmitting optical signals (663-1 to 663-N and 666-1 to 666-N, respectively). Cross connect 660 also includes a curved beam steerer 667 and a folding beam steerer 668. Optionally, beam steerers can be used at any of the ports 662-1 to 662-N and 665-1 to 665-N to steer one of the optical signals 663-1 to 663-N and 666-1 to 666-N onto beam steerers 667 and 668. In this embodiment, folding beam steerer 668 is planar, but a curved and folding beam steerer may also be used to replace the combination of curved beam steerer 667 and planar folding beam steerer 668 or to just replace planar folding beam steerer 668. The curvature of beam steerer 667 can be configured for example by adjusting R and z to achieve and end result of reducing path length differences (such as the difference between the path length made from segments 669 and 670 and the path length made from segments 671 and 670. In addition, arrays 661 and 664, lens 667 and beam steerer 668, can be positioned relative to each other to reduce physical system size and reduce path length differences.

Figure 7:
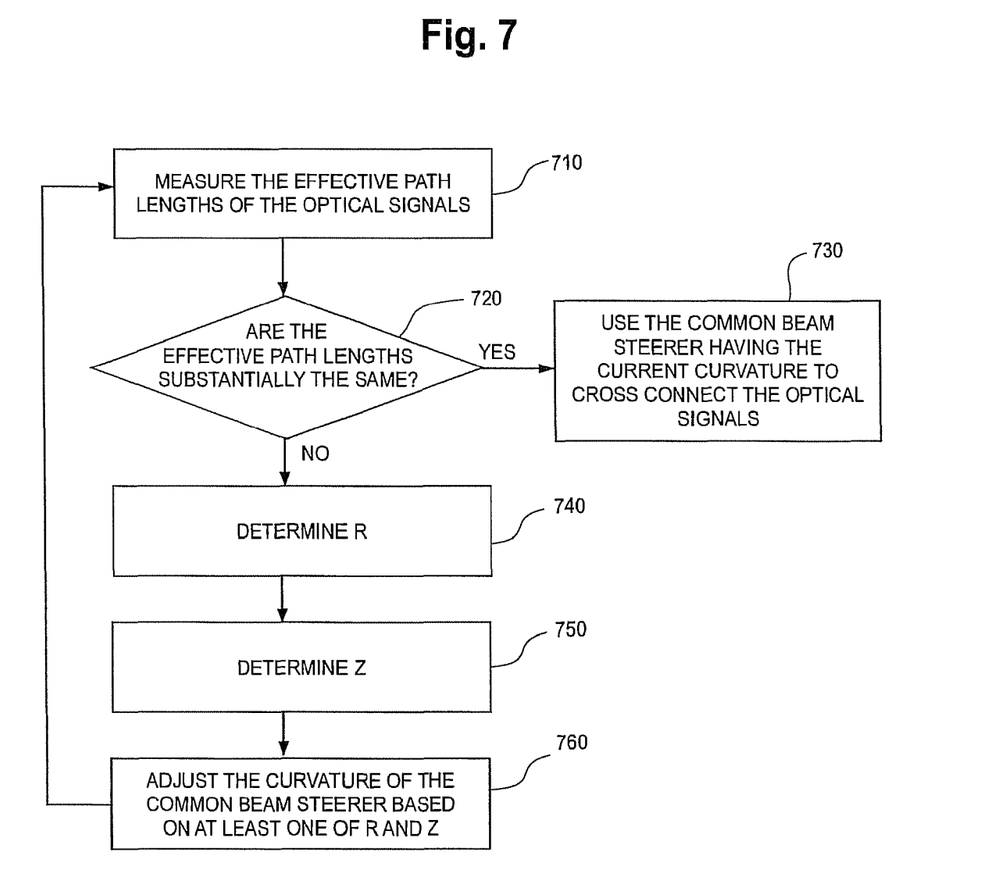
FIG. 7 is a flow diagram that illustrates the method of adjusting the curvature of the curved surface of a beam steerer to be used in a cross connect, according to an exemplary embodiment of the invention.

FIG. 7 is a flow diagram that illustrates an exemplary embodiment method of adjusting the curvature of the curved surface of a beam steerer to achieve an end result of reducing path length differences and making substantially uniform insertion losses. Some of the steps illustrated in the flow diagrams may be performed in an order other than that which is described. Also, it should be appreciated that not all of the steps described in the flow diagram are required to be performed, that additional steps may be added, and that some of the illustrated steps may be substituted with other steps. At step 710, the effective path lengths of optical signals (transmitted between input and output ports and steered by a common beam steerer having a curved surface) are measured. At step 720, the effective path lengths are checked if they are substantially the same. If so, the next step is 730, where the common beam steerer (having the current curvature of its curved surface) is used to cross-connect the optical signals. Otherwise, the next step is 740, where R, the radius of the curved surface, is determined. At step 750, z, the minimum optical path length of the paths of the optical signals (transmitted between the input and output ports and steered by the common beam steerer) is determined. At step 760, the curvature of the common beam steerer is adjusted based on at least one of R and z. The next step is 710.

Figure 8:
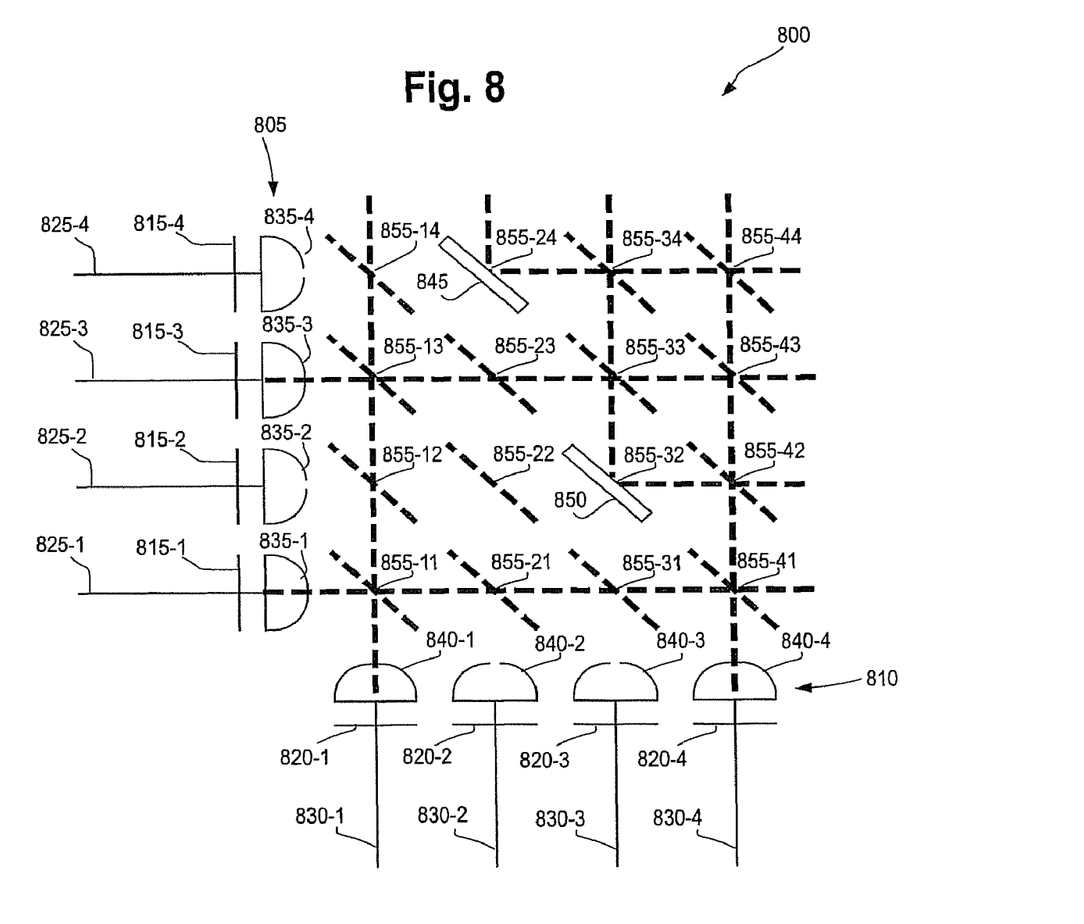
FIG. 8 illustrates an optical cross connect including arrays of input/output ports, collimators and reflective beam steerers, according to an exemplary embodiment of the invention.

FIG. 8 illustrates exemplary embodiment cross connect 800, which uses collimators (such as lenses) to make substantially uniform insertion losses among paths in the cross connect. Cross connect 800 includes arrays 805 and 810, having ports (815-1 to 815-4 and 820-1 to 820-4, respectively) for receiving and/or transmitting optical signals (825-1 to 825-4 and 830-1 to 830-4, respectively), collimators (835-1 to 835-4 and 840-1 to 840-4, respectively), and reflective beam steerers 845 and 850.

Depending up on which ports are used for inputting and outputting a signal, the physical path length of a cross-connected signal may vary. To illustrate this, exemplary cross connections and corresponding physical path lengths of the optical signals cross connected can be described. An exemplary first cross connection is as follows: optical signal 825-4 enters port 815-4, passes through collimator 835-4, strikes reflective beam steerer 845 to be directed to port 820-1 and exit as optical signal 830-2. For this first cross connection, the physical path length is four segments long, passing through the points 855-14, 855-24, 855-23, 855-22 and 855-21. An exemplary second cross connect is as follows: optical signal 825-2 enters port 815-2, passes through collimator 835-2, strikes reflective beam steerer 850 to be directed to port 820-3 an exit as signal 830-3. For the second cross connect, the physical path length is three segments long, passing through the points 855-12, 855-22, 855-32 and 855-31.

Due to the physical path length differences of cross connections in cross connects such as cross connect 800, variable insertion losses among the paths may result. However, collimators (such as 835-1 to 835-4 and 840-1 to 840-4) having appropriate focal lengths can be used in the cross connect to make substantially uniform insertion losses among the paths.

From the foregoing, it will be observed that numerous variations and modifications may be effected without departing from the spirit and scope of the invention. For example, beam steerers employed by exemplary embodiments of the present invention, can be focusers, lenses, MEMS devices, reflectors, mirrors, collimators, acoustic-optical devices, thermo-optical devices, holographic devices, tunable lasers, gallium arsenide waveguides or other waveguides, and/or methods or apparatus that will transmit an incoming light beam in a desired direction. Moreover, exemplary embodiment port arrays of the present invention, could incorporate beam steerers at each of the ports, input ports, output ports, and input/output ports to unidirectionally and/or bidirectionally transmit light. In addition, exemplary embodiment port arrays can be planar and two-dimensional (having M columns and N rows) or one-dimensional (having N rows) and/or be confined to a spherical or non-spherical (e.g. parabolic, hyperbolic, elliptical, sine wave) curve and/or where $R \diamond z$. Finally, curved beam steerers employed by exemplary embodiments can have a spherical or non-spherical (e.g. parabolic, hyperbolic, elliptical, sine wave) curvature. It is to be understood that no limitation with respect to the specific apparatus illustrated herein is intended or should be inferred. It is, of course, intended to cover by the appended claims all such modifications as fall within the scope of the claims.

The invention claimed is:

1. An apparatus for cross connecting optical signals, comprising:
    a first plurality of ports, members of the first plurality of ports are adapted for at least one of receiving, transmitting optical signals;
    a second plurality of ports, members of the second plurality of ports are adapted for at least one of receiving, transmitting optical signals; and
    respective optical compensation element in at least some of a plurality of paths of corresponding optical signals transmitted between the members of the first and second plurality of ports, the optical compensation element adapted to collimate the respective optical signal of the at least some paths based upon a distance of the path in order to make the insertion loss of the respective at least some paths substantially the same as the insertion loss of others of the plurality of paths.

2. The apparatus of claim 1, wherein at least one of the first and second pluralities of ports is confined to a plane.

3. The apparatus of claim 1, wherein the element has a reflective surface.

4. The apparatus of claim 1, wherein the element comprises a lens.

5. An apparatus as in claim 1 wherein:
the first plurality comprises a first input port and a second input port;
the second plurality comprises a first output port and a second output port where only one pair of input/output ports has a shortest path therebetween; and
where the compensation element comprises a first beam steerer, adapted to receive a first optical signal from the first input port and direct the first optical signal to the first output port along a first path, and
a second beam steerer, adapted to receive a second optical signal from the second input port and direct the second optical signal to the second output port along a second path; and
an optical modifier of at least one of the paths so that the paths have substantially the same insertion loss.

6. The apparatus of claim 5 where the modifier comprises at least one of a reflector or a lens.

7. An apparatus as in claim 5 where members of the one pair or ports are adjacent to one another.

8. An apparatus as in claim 1 wherein:
members of the first plurality comprise a plurality of input ports;
members of the second plurality comprise a plurality of output ports where only one pair of input/output ports has a shortest path therebetween; and
the compensation element comprises a plurality of optical elements to selectively establish transit paths between input and output ports where the paths have substantially a common insertion loss.

9. An apparatus as in claim 8 where the elements are selected from a class which includes lenses and reflectors.

10. An apparatus as in claim 9 where the elements include at least one reflector and at least one lens located on at least one transit path.

11. An apparatus as in claim 10 where the elements are located on a plurality of transit paths.

12. An apparatus as in claim 9 which includes a first lens, reflector pair located on a first transit path and a second lens, reflector pair located on a second transit path.

13. An apparatus as in claim 12 where the first and second pairs are different.

14. An apparatus as in claim 12 where at least one of the input ports is different than at least one of the output ports.

15. A method of switching optical signals comprising:
establishing first and second optical input ports;
establishing first and second optical output ports where each input/output port combination has an associated transit path with an associated transit distance between respective ports with some of the transit distances being different than others where only one pair of input/output ports has a shortest path therebetween; and
providing an optical path modification element that in at least one of the associated transit paths, the optical path modification element adapted to collimate the optical signal of the at least one transit path based upon the transit distance of the path in order to make the insertion loss of the at least one transit path substantially the same as the other associated transit paths.

16. A method as in claim 15 where providing includes providing at least one of a lens or a reflector.

17. A method as in claim 16 where providing includes providing both a lens and a reflector.

18. A method as in claim 15 which includes locating the element in at least some of the transit paths.

19. A method as in claim 15 which includes locating both the lens and the reflector in at least some of the transit paths.

20. A method as in claim 15 where providing includes one of locating both a lens and a reflector in a selected transit path, or, locating first and second reflectors in a selected transit path.

21. An apparatus as in claim 15 where members of the one pair of ports are adjacent one another.

22. An apparatus as in claim 15 where only one pair of input/output port has a shortest path therebetween.

23. An apparatus as in claim 22 where members of the one pair of ports are adjacent to one another.

* * * * *